US012783057B2

(12) United States Patent
Wei et al.

(10) Patent No.: US 12,783,057 B2
(45) Date of Patent: Nov. 3, 2026

(54) HEAD-MOUNTED DISPLAY DEVICE, COMMAND SENSING METHOD AND NON-TRANSITORY COMPUTER READABLE STORAGE MEDIUM

(71) Applicant: HTC Corporation, Taoyuan City (TW)

(72) Inventors: Chang Hua Wei, Taoyuan City (TW); Yu-Ling Huang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 268 days.

(21) Appl. No.: 18/663,085

(22) Filed: May 14, 2024

(65) Prior Publication Data

US 2025/0355498 A1 Nov. 20, 2025

(51) Int. Cl.

| | |
|---|---|
| ***G06F 3/01*** | (2006.01) |
| ***G02B 27/01*** | (2006.01) |
| ***G06F 3/0346*** | (2013.01) |
| ***G06V 40/10*** | (2022.01) |
| ***G06V 40/20*** | (2022.01) |

(52) U.S. Cl.

CPC ......... *G06F 3/017* (2013.01); *G02B 27/0101* (2013.01); *G02B 27/017* (2013.01); *G06F 3/011* (2013.01); *G06F 3/0346* (2013.01); *G06V 40/10* (2022.01); *G06V 40/28* (2022.01); *G02B 2027/0138* (2013.01); *G02B 2027/014* (2013.01)

(58) Field of Classification Search

CPC ........ G06F 3/017; G06F 3/011; G06F 3/0346; G02B 27/0101; G02B 27/017; G06V 40/10

See application file for complete search history.

(56) References Cited

U.S. PATENT DOCUMENTS

| | | | | |
|---|---|---|---|---|
| 10,156,908 | B2 * | 12/2018 | Stafford | G06F 3/014 |
| 2017/0357332 | A1 | 12/2017 | Balan et al. | |
| 2022/0198755 | A1 * | 6/2022 | Pinchon | G06T 19/003 |
| 2023/0161416 | A1 | 5/2023 | Cohen et al. | |
| 2024/0192766 | A1 * | 6/2024 | Furtwangler | G06F 3/011 |

FOREIGN PATENT DOCUMENTS

| | | | |
|---|---|---|---|
| CN | 103858073 | A | 6/2014 |
| CN | 107896508 | A | 4/2018 |
| CN | 110347260 | A | 10/2019 |
| CN | 112651288 | A | 4/2021 |
| TW | 202109244 | A | 3/2021 |
| TW | 202236080 | A | 9/2022 |

OTHER PUBLICATIONS

The office action of the corresponding Taiwanese application No. TW114111943 issued on Feb. 13, 2026.

* cited by examiner

*Primary Examiner* — Cao H Nguyen
(74) *Attorney, Agent, or Firm* — CKC & Partners Co., LLC

(57) ABSTRACT

A command sensing method, for a head-mounted display device, includes following steps. Streaming images are captured. A hand gesture is tracked according to the streaming images. Whether the hand gesture matches with a preparation pattern is monitored. In response to the hand gesture matching with the preparation pattern at a first time point, a tracking of a hand movement is activated during a sensing period started from the first time point until a second time point. During the sensing period, whether the hand movement matches with a command pattern corresponding to the preparation pattern is monitored. In response to the hand movement matching with the command pattern, an operation corresponding to the command pattern is executed.

18 Claims, 8 Drawing Sheets

HEAD-MOUNTED DISPLAY DEVICE, COMMAND SENSING METHOD AND NON-TRANSITORY COMPUTER READABLE STORAGE MEDIUM

BACKGROUND

Field of Invention

The disclosure relates to a command sensing method. More particularly, the disclosure is the command sensing method on a head-mounted display device based on a hand gesture or a hand movement.

Description of Related Art

Virtual Reality (VR), Augmented Reality (AR), Substitutional Reality (SR), and/or Mixed Reality (MR) devices are developed to provide immersive experiences to users. When a user wearing a head-mounted display (HMD) device, the visions of the user will be covered by the immersive content shown on the head-mounted display device. The immersive content shows a virtual background and some virtual objects in an immersive scenario.

The immersive system is configured to track a hand gesture of the user, such that the user may perform some interacting operations (e.g., touch, tap, click, push) on the virtual objects. It is important that the hand gesture of the user can be tracked correctly and precisely to provide a real immersive experience.

SUMMARY

The disclosure provides a head-mounted display device, which includes a camera unit and a processor. The camera unit is configured to capture a plurality of streaming images. The processor is coupled to the camera unit. The processor is configured to track a hand gesture according to the streaming images. The processor is further configured to monitor whether the hand gesture matches with a preparation pattern. In response to the hand gesture matching with the preparation pattern at a first time point, the processor is further configured to activate a tracking of a hand movement during a sensing period started from the first time point until a second time point. During the sensing period, the processor is further configured to monitor whether the hand movement matches with a command pattern corresponding to the preparation pattern. In response to the hand movement matching with the command pattern, the processor is further configured to execute an operation corresponding to the command pattern.

The disclosure also provides a command sensing method, include steps of: capturing a plurality of streaming images; tracking a hand gesture according to the streaming images; monitoring whether the hand gesture matches with a preparation pattern; in response to the hand gesture matching with the preparation pattern at a first time point, activating a tracking of a hand movement during a sensing period started from the first time point until a second time point; during the sensing period, monitoring whether the hand movement matches with a command pattern corresponding to the preparation pattern; and, in response to the hand movement matching with the command pattern, executing an operation corresponding to the command pattern.

The disclosure also provides a non-transitory computer readable storage medium with a computer program. The computer program is configured to execute aforesaid command sensing method.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
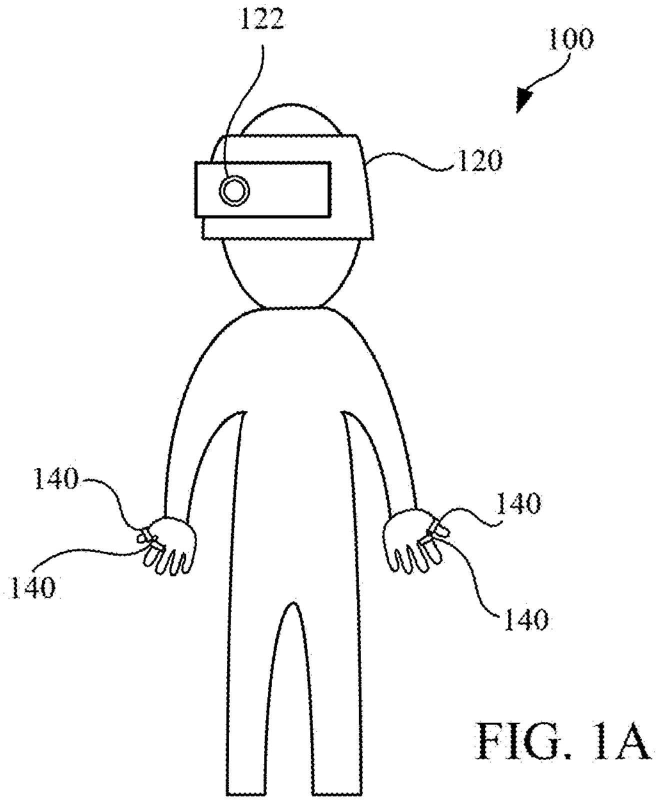
FIG. 1A is a schematic diagram illustrating an immersive system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
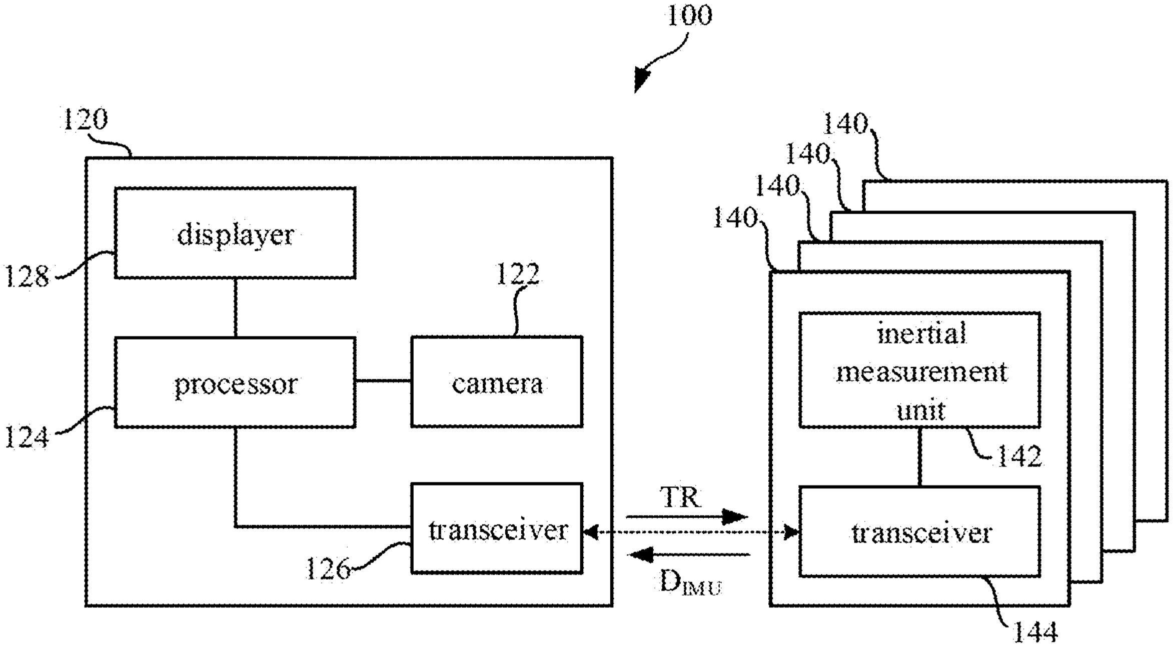
FIG. 1B is a functional block diagram illustrating the immersive system in FIG. 1A according to an embodiment of the disclosure.

Reference is made to FIG. 1A and FIG. 1B. FIG. 1A is a schematic diagram illustrating an immersive system 100 according to an embodiment of the disclosure. FIG. 1B is a functional block diagram illustrating the immersive system 100 in FIG. 1A according to an embodiment of the disclosure. The immersive system 100 includes a head-mounted display (HMD) device 120 and at least one wearable device 140.

In the embodiments shown in FIG. 1A, the at least one wearable device 140 includes four smart rings worn on four different fingers of a user. However, the disclosure is not limited to a specific amount the wearable device 140. In some other embodiments, the immersive system 100 can include K wearable devices 140 worn on K fingers of the user. K is a positive integer in a range from 1 to 10.

As shown in FIG. 1B, in some embodiments, the head-mounted display device 120 includes a camera 122, a processor 124, a transceiver 126 and a displayer 128. The processor 124 is coupled to the camera 122, the transceiver 126 and the displayer 128. In some embodiments, the camera 122 can be disposed on a front surface of the head-mounted display device 120. The camera 122 is configured to capture a series of streaming images. The camera 122 may include lens, an optical sensor and/or a graphic processing unit. The processor 124 may include a central processing unit, a microcontroller (MCU) or an application-specific integrated circuit (ASIC). The transceiver 126 may include a local communication circuit (e.g., Bluetooth transceiver, a WiFi transceiver, a Zigbee transceiver) or a telecommunication circuit (e.g., 4G transceiver, 5G transceiver). The displayer 128 may include a display panel for displaying an immersive environment toward user's visions.

Based on the streaming images captured by the camera 122, the head-mounted display device 120 is able to track a hand gesture (and/or a hand movement) of the user, further to detect a user input command and execute a corresponding function. If the hand gesture/movement of the user is detected solely based on the streaming images captured by the camera 122, the detected hand gesture/movement can be inaccurate in some extreme cases (e.g., the hand moving slightly in view of the camera 122, the user stands under a bright light, user's hand moves out of a field of view of the camera).

In some embodiments, the wearable devices 140 can provide additional information besides the streaming images, in order to track of the hand gesture/movement more accurately. As shown in FIG. 1B, each of the wearable devices 140 may include an inertial measurement unit 142 and a transceiver 144. The inertial measurement unit 142 is configured for generating inertial measurement data $D_{IMU}$. The inertial measurement data $D_{IMU}$ is able to indicate accelerations along X/Y/Z axes and/or orientations of each wearable device 140. The inertial measurement data $D_{IMU}$ can be transmitted by the transceiver 144 from each wearable device 140 to the head-mounted display device 120. The inertial measurement unit 142 may include gyro sensors and accelerometers. The transceiver 144 may include a local communication circuit (e.g., Bluetooth transceiver, a WiFi transceiver, a Zigbee transceiver) or a telecommunication circuit (e.g., 4G transceiver, 5G transceiver). The head-mounted display device 120 can track the hand gesture/movement further according to the inertial measurement data $D_{IMU}$. The inertial measurement unit 142 is coupled to the transceiver 144.

On the other hand, if the hand gesture/movement of the user is detected solely based on the inertial measurement data $D_{IMU}$ detected by the wearable devices 140, it may cause a false trigger of an undesired function on the head-mounted display device 120.

In some embodiments, the head-mounted display device 120 perform a command sensing method to detect user's hand gesture/movement based on a combination of the streaming images captured by the camera 122 and the inertial measurement data $D_{IMU}$ gathered from the wearable devices 140, such that the head-mounted display device 120 can execute a corresponding command based on the hand gesture/movement.

Figure 2:
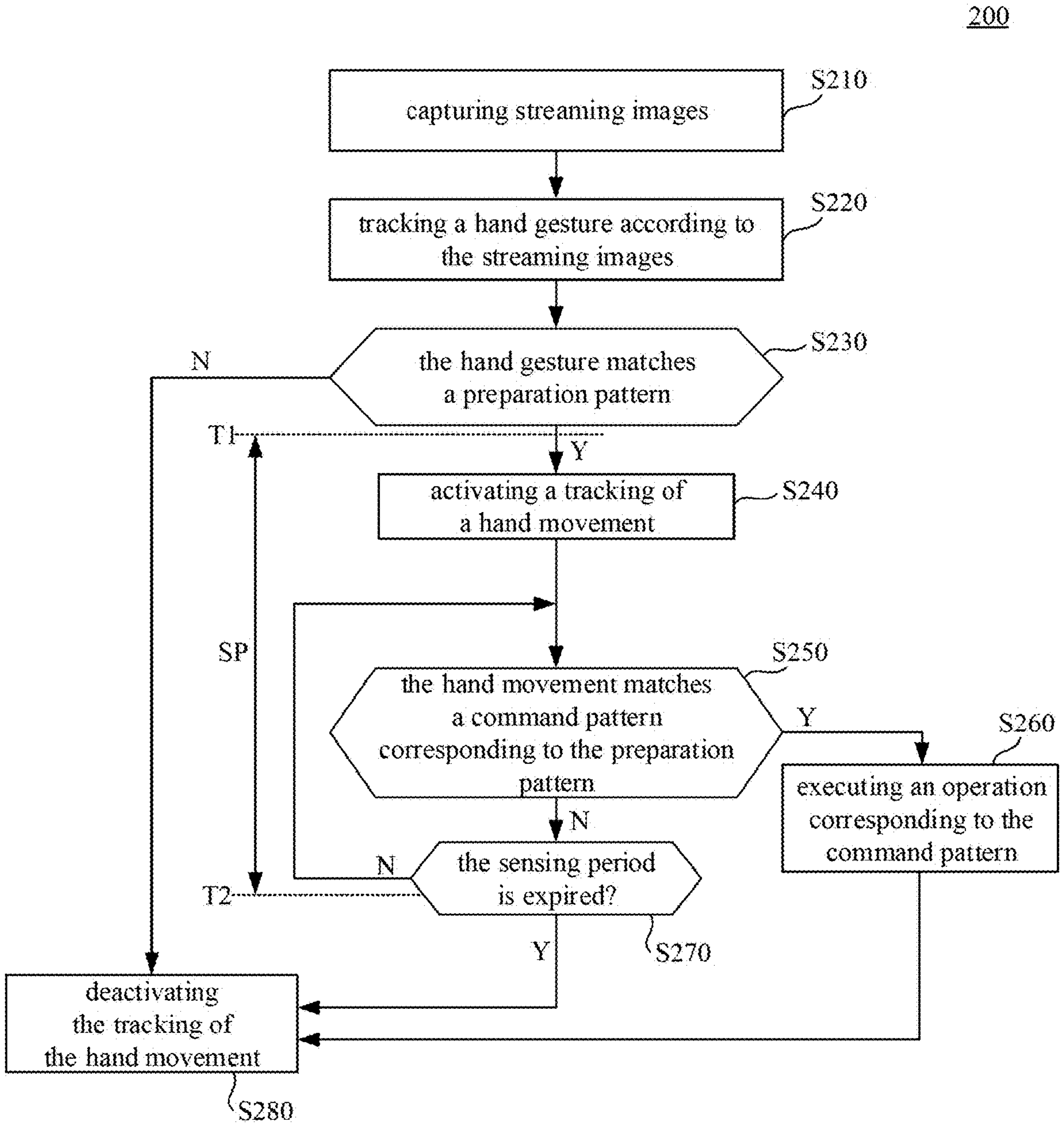
FIG. 2 is a flow chart illustrating a command sensing method according to some embodiments of the disclosure.

Reference is further made to FIG. 2, which is a flow chart illustrating a command sensing method 200 according to some embodiments of the disclosure. The command sensing method 200 can be executed by the head-mounted display device 120 shown in FIG. 1B. In step S210 of the command sensing method 200, the camera 122 is configured to capture the streaming images.

Figure 3A:
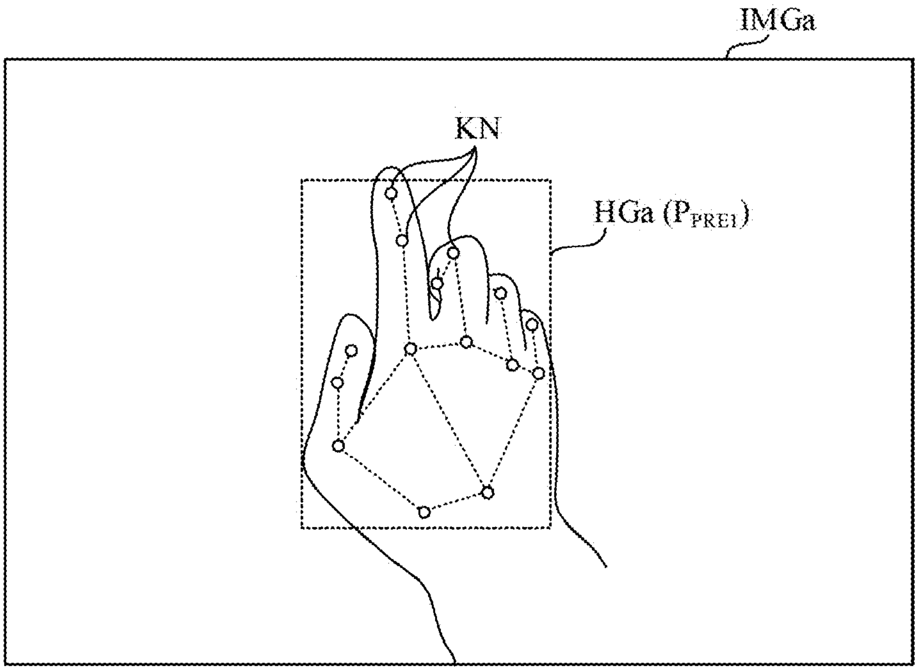
FIG. 3A is a schematic diagram illustrating streaming images involving a hand gesture in an example.
Figure 3B:
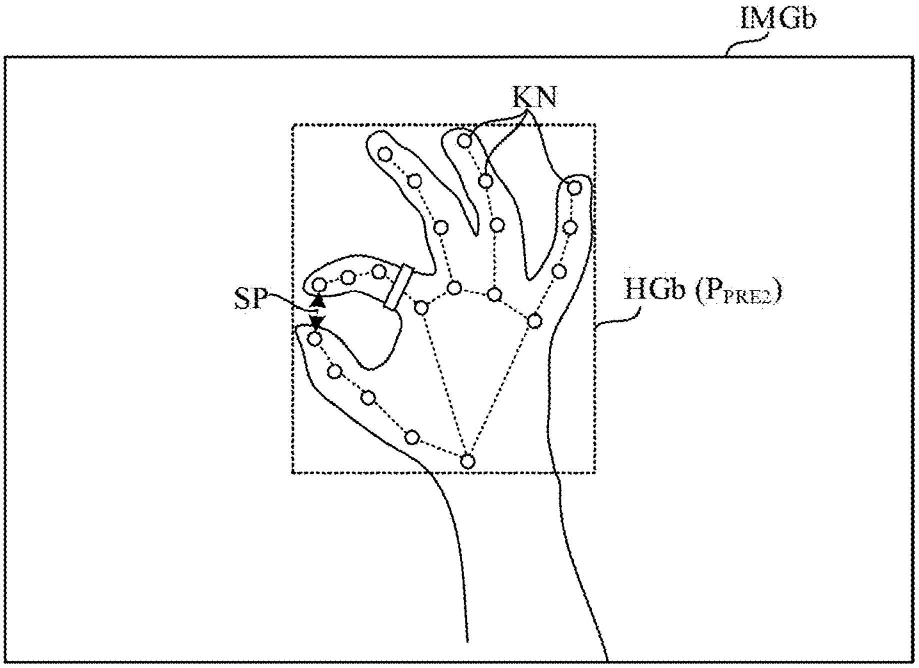
FIG. 3B is a schematic diagram illustrating other streaming images involving another hand gesture in another example.
Figure 3C:
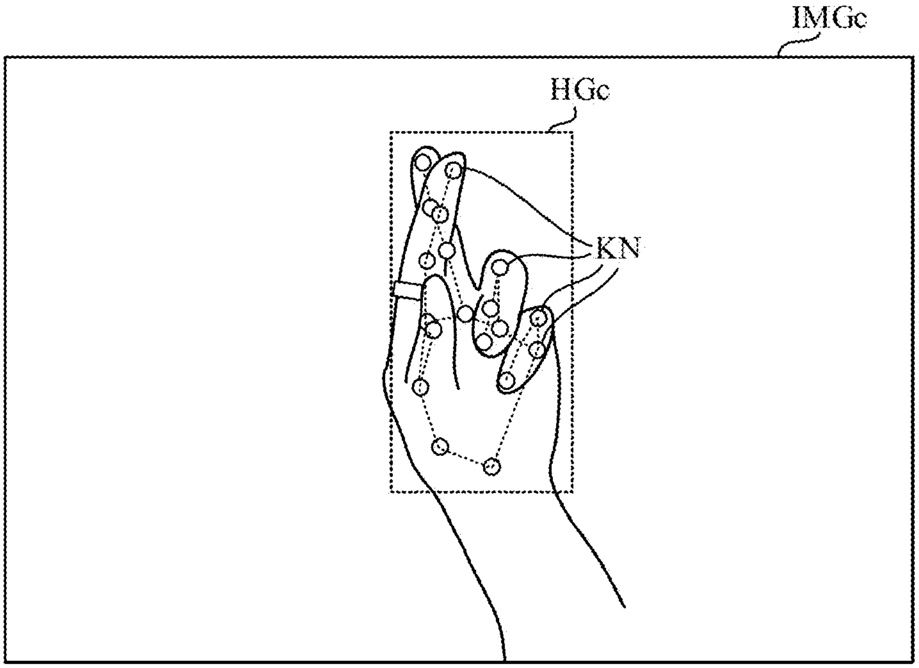
FIG. 3C is a schematic diagram illustrating other streaming images involving another hand gesture in another example.

In step S220, the processor 124 is configured to track a hand gesture according to the streaming images captured by the camera 122. Reference is further made to FIG. 3A, FIG. 3B and FIG. 3C. FIG. 3A is a schematic diagram illustrating streaming images IMGa involving a hand gesture HGa in an example. FIG. 3B is a schematic diagram illustrating other streaming images IMGb involving another hand gesture HGb in another example. FIG. 3C is a schematic diagram illustrating other streaming images IMGc involving another hand gesture HGc in another example.

As shown in FIG. 3A, the processor 124 is configured to performing a computer vision algorithm to identify and locate knuckle positions KN of a hand in the streaming images IMGa. Based on the distribution of the knuckle positions KN, the processor 124 is able to track the hand gesture HGa appeared in the streaming images IMGa.

Similarly, as shown in FIG. 3B and FIG. 3C, the processor 124 is configured to performing a computer vision algorithm to identify and locate knuckle positions KN of a hand in the streaming images IMGb and the streaming images IMGc. Based on the distribution of the knuckle positions KN, the processor 124 is able to track the hand gesture HGb appeared in the streaming images IMGb and the hand gesture HGc appeared in the streaming images IMGc.

Because the knuckle positions KN of the hand are distributed differently in FIG. 3A, FIG. 3B and FIG. 3C, different hand gesture HGa, HGb and HGc are recognized by the processor 124 according to the streaming images IMGa, IMGb and IMGc.

In step S230, the processor 124 is configured to monitor whether the hand gesture HGa, HGb or HGc appeared in the streaming images IMGa~IMGc matches with a preparation pattern. The preparation pattern is a predetermined gesture formation which indicates that the user is potentially or about to perform a command input.

For example, the preparation pattern includes a clicking preparation pattern $P_{PRE1}$ (indicating the user is about to perform a clicking input) as shown in FIG. 3A, and the clicking preparation pattern $P_{PRE1}$ is in a formation with at least one finger hovering diagonally upward in front of the head-mounted display device 120.

For example, the preparation pattern may include a pinching preparation pattern $P_{PRE2}$ (indicating the user is about to perform a pinching input) as shown in FIG. 3B, and the pinching preparation pattern $P_{PRE2}$ is in a formation with two fingers hovering with a space SP between the two fingers.

On the other hands, the hand gesture HGc (e.g., a scissor-like hand gesture) appeared in FIG. 3C is not similar to any one of the clicking preparation pattern $P_{PRE1}$ and pinching preparation pattern $P_{PRE2}$. In this case, in step S230, if the processor 124 receives the streaming images IMGc from the camera 122, and the processor 124 determines that the hand gesture HGc in the streaming images IMGc fail to match with the preparation pattern, and the command sensing method 200 goes to step S280.

In a first demonstrational case, it is assumed that the processor 124 receives the streaming images IMGa from the camera 122, and the processor 124 will determine that the hand gesture HGa in the streaming images IMGa matches with the clicking preparation pattern $P_{PRE1}$ at a first time point T1. In this case, step S240 is executed to activate a tracking of a hand movement during a sensing period SP started from the first time point T1 until a second time point T2.

In some embodiments, the second time point T2 can be set at a suitable time point after the first time point T1. For example, the second time point T2 can be set at 500 microseconds after the first time point T1 (i.e., a time length of the sensing period SP equals to 500 ms).

In some embodiments, in step S240, the tracking of the hand movement is based on the inertial measurement data $D_{IMU}$ from the wearable devices 140. In this case, as shown in FIG. 1B, the processor 124 is configured to transmit a triggering signal TR to each of the wearable devices 140. The triggering signal TR is configured to activate the inertial measurement unit 142 in each of the wearable devices 140. In response to the triggering signal TR, the wearable devices 140 will transmit the inertial measurement data $D_{IMU}$ back to the processor 124 of the head-mounted display device 120. In step S240, the processor is configured to track the hand movement according to inertial measurement data $D_{IMU}$ received from at least one of the wearable devices 140.

Figure 4A:
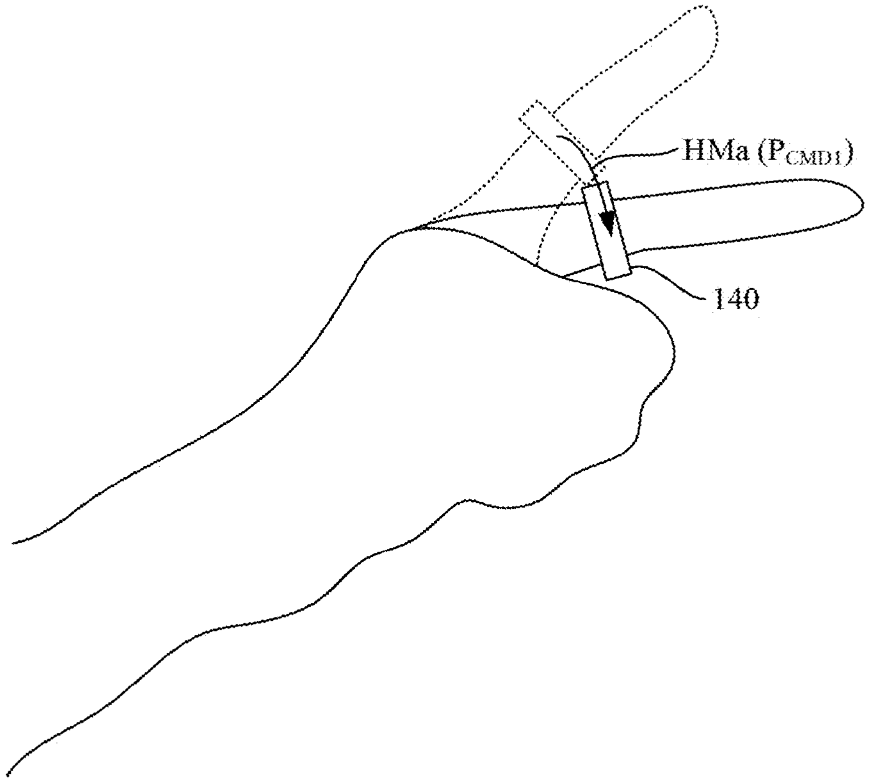
FIG. 4A is a schematic diagram illustrating a hand movement in a demonstrational example.
Figure 4B:
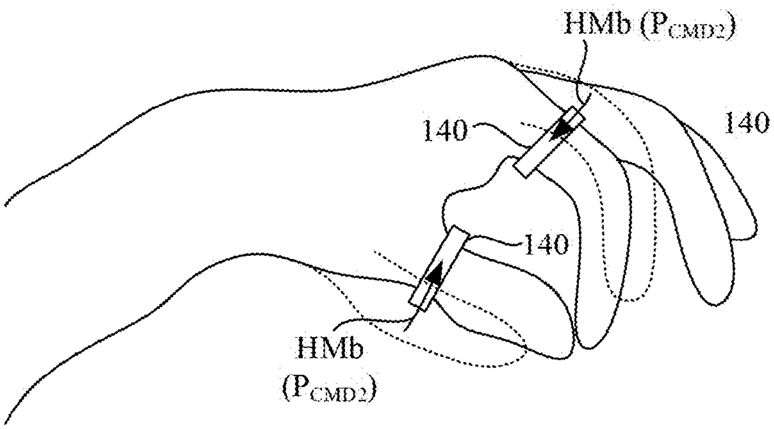
FIG. 4B is a schematic diagram illustrating another hand movement in a demonstrational example.

Reference is further made to FIG. 4A and FIG. 4B. FIG. 4A is a schematic diagram illustrating a hand movement HMa in a demonstrational example. FIG. 4B is a schematic diagram illustrating another hand movement HMb in a demonstrational example.

In some embodiments shown in FIG. 4A, based on the inertial measurement data $D_{IMU}$ received from the wearable devices 140, the hand movement HMa can be determined as at least one finger pressing down or moving downward. For example, the hand movement HMa can be determined mainly according to a vertical acceleration along a Z-axis within the inertial measurement data $D_{IMU}$.

In step S250, during the sensing period SP, the processor 124 is configured to monitor whether the hand movement HMa matches with a command pattern corresponding to the preparation pattern (e.g., the clicking preparation pattern $P_{PRE1}$ determined in step S230).

For example, the command pattern includes a clicking command pattern $P_{CMD1}$ (indicating the user is performing a clicking input) as shown in FIG. 4A, and the clicking command pattern $P_{CMD1}$ is in a formation with the at least one finger pressing or moving downward as shown in FIG. 4A.

In the first demonstrational case, if the hand movement HMa shown in FIG. 4A is detected in step S250 after that the clicking preparation pattern $P_{PRE1}$ is detected in step S230, the processor 124 detects that the hand movement HMa matches with the clicking command pattern $P_{CMD1}$ corresponding to the clicking preparation pattern $P_{PRE1}$, such that step S260 is executed by the processor 124 to execute an operation (e.g., clicking operation on a button, an icon or a confirmation) corresponding to the clicking command pattern $P_{CMD1}$ on the head-mounted display device 120.

In other embodiments shown in FIG. 4B, based on the inertial measurement data $D_{IMU}$ received from the wearable devices 140, the hand movement HMb can be determined as two fingers moving toward each other. For example, the hand movement HMb can be determined mainly according to lateral accelerations in inertial measurement data $D_{IMU}$ from two wearable devices 140 worn on two fingers.

In the first demonstrational case, if the hand movement HMb shown in FIG. 4B is detected in step S250 after that the clicking preparation pattern $P_{PRE1}$ is detected in step S230, the processor 124 detects that the hand movement HMb detected in step S250 fails to match with the clicking command pattern $P_{CMD1}$ (referring to FIG. 4A) corresponding to the clicking preparation pattern $P_{PRE1}$ detected in step S230. In this case, the hand movement HMb can be regarded as an invalid command, and the processor 124 will not execute a corresponding operation (because there is no trustworthy command detected). The command sensing method 200 goes to step S270. In step S270, the processor detects whether the sensing period SP is expired. If the sensing period SP is not expired yet, the command sensing method 200 returns to step S250 and keeps monitoring the hand movement.

If the sensing period SP is expired, the command sensing method 200 goes to step S280, the processor 124 is configured to deactivate the tracking of the hand movement. In some embodiments, in step S280, the processor 124 can ignore the inertial measurement data $D_{IMU}$ from the wearable devices 140. In some other embodiments, in step S280, the processor 124 can generate a stop signal (not shown in figures) to each of the wearable devices 140 to deactivate the inertial measurement unit 142 in each of the wearable devices 140. In some other embodiments, in step S280, the processor 124 can turn off the transceiver 126 to block transmission of the inertial measurement data $D_{IMU}$.

In the first demonstrational case in aforesaid paragraphs, it is assumed that the processor 124 receives the streaming images IMGa from the camera 122, and the processor 124 determines that the hand gesture HGa in the streaming images IMGa matches with the clicking preparation pattern $P_{PRE1}$ at the first time point T1. However, the disclosure is not limited thereto.

In a second demonstrational case, it is assumed that the processor 124 receives the streaming images IMGb from the camera 122, and the processor 124 determines that the hand gesture HGb in the streaming images IMGb matches with the pinching preparation pattern $P_{PRE2}$ at the first time point T1 in step S230. Then, step S240 is executed to activate the tracking of the hand movement.

In the second demonstrational case, if the hand movement HMa shown in FIG. 4A is detected in step S250 after that the pinching preparation pattern $P_{PRE2}$ is detected in step S230, the processor 124 detects that the hand movement HMa fails to match with the pinching command pattern $P_{CMD2}$ (referring to FIG. 4B) corresponding to the pinching preparation pattern $P_{PRE2}$ (referring to FIG. 3B). In this case, the hand movement HMa can be regarded as an invalid command, and the processor 124 will not execute a corresponding operation (because there is no trustworthy command detected). The command sensing method 200 goes to step S270.

On the other hand, in the second demonstrational case, if the hand movement HMb shown in FIG. 4B is detected in step S250 after that the pinching preparation pattern $P_{PRE2}$ is detected in step S230, the processor 124 detects that the hand movement HMb matches with the pinching command pattern $P_{CMD2}$ (referring to FIG. 4B) corresponding to the pinching preparation pattern $P_{PRE2}$ (referring to FIG. 3B). As shown in FIG. 4B, the pinching command pattern $P_{CMD2}$ is in a form with the two fingers moving toward each other. In this case, step S260 is executed by the processor 124 to execute an operation (e.g., pinching operation to collect, hold or deform a virtual object) corresponding to the pinching command pattern $P_{CMD2}$ on the head-mounted display device 120.

Based on aforesaid embodiments, the preparation patterns and the corresponding command patterns are utilized to double check the operation which the user intends to input. If the hand gesture matching the preparation pattern is detected and the hand movement matching the corresponding command pattern is not detected, the operation will not be executed, so as to increase the accuracy of the command sensing method 200. If the hand gesture matching the preparation pattern is not detected, the tracking of the hand movement can be deactivated, so as to reduce power consumption on the head-mounted display device 120 and/or the wearable device 140, and also to save computation resources on the head-mounted display device 120 and/or the wearable device 140.

The preparation patterns and the command patterns in this disclosure are not limited to clicking and pinching as discussed above. The head-mounted display device 120 and the command sensing method 200 can handle other similar preparation patterns and the command patterns (e.g., patting, grasping, clapping, holding and so on).

In aforesaid embodiments, the processor 124 is configured to track the hand movement according to the inertial measurement data $D_{IMU}$ received from the wearable devices 140. However, the disclosure is not limited thereto.

In some other embodiments, the processor 124 is configured to track the hand movement in step S240 by performing the computer vision algorithm to locate knuckle positions of the hand in the streaming images (similar to embodiments shown in FIG. 3A, FIG. 3B and FIG. 3C), and tracking the hand movement according to the knuckle positions. In this case, both of the hand gesture (relative to the preparation pattern) and the hand movement (relative to the command pattern) are tracked according to the computer vision algorithm based on the streaming images captured by the camera 122. In this case, the head-mounted display device 120 does not rely on the wearable devices 140. The head-mounted display device 120 alone (without aiding from the wearable devices 140) is able to compare the hand gesture with the preparation pattern and also compare the hand movement with the command pattern, so as double check the operation which the user intends to input.

Figure 5:
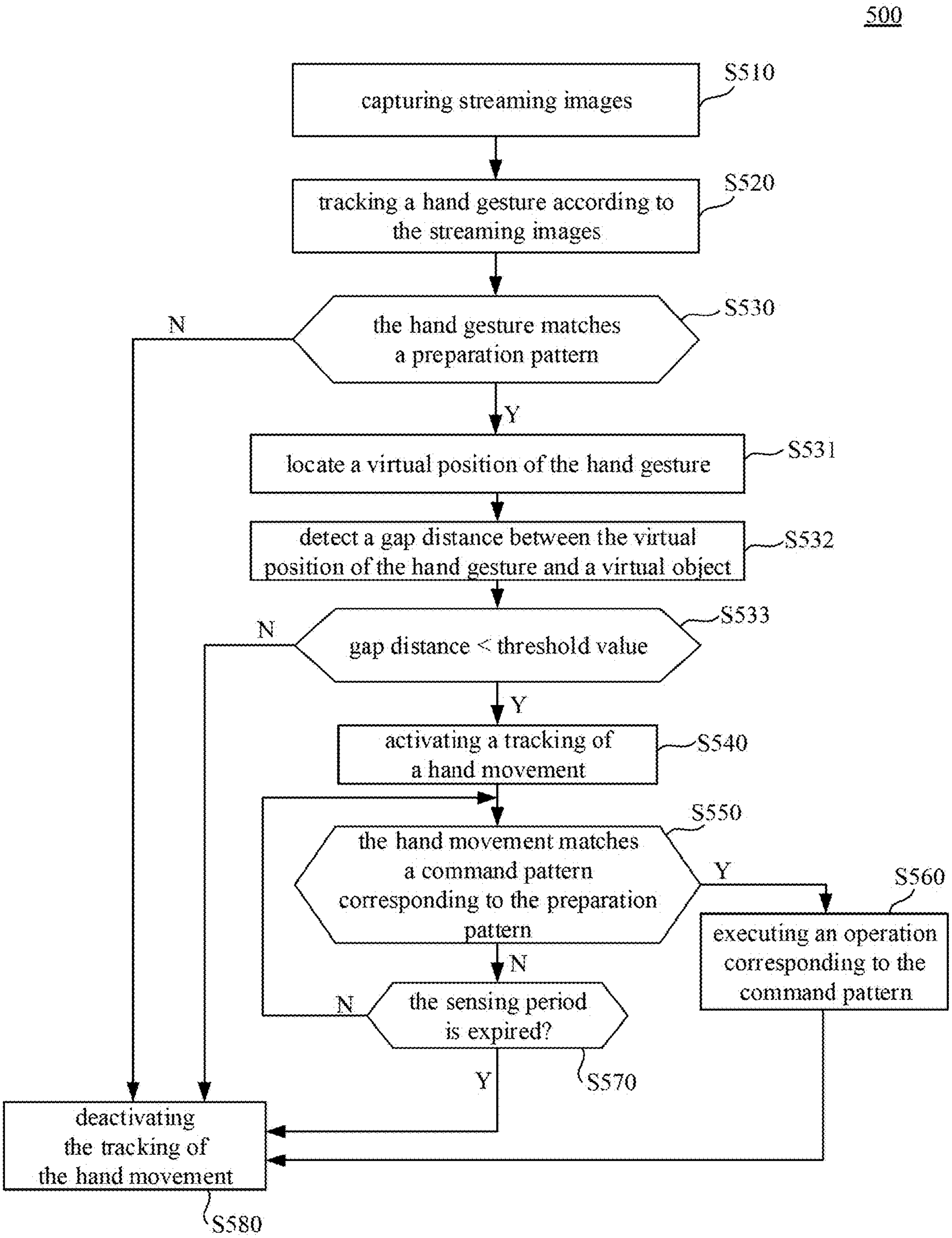
FIG. 5 is a flow chart illustrating a command sensing method according to some embodiments of the disclosure.

Reference is further made to FIG. 5, which is a flow chart illustrating a command sensing method 500 according to some embodiments of the disclosure. The command sensing method 500 in FIG. 5 can be executed by the head-mounted display device 120 shown in FIG. 1B. Steps S510, S520, S530, S540, S550, S560, S570 and S580 of the command sensing method 500 in FIG. 5 are similar to aforesaid steps S210, S220, S230, S240, S250, S260, S270 and S280 of the command sensing method 200 in FIG. 2 discussed in previous paragraphs, and details of these steps are not repeated here.

As shown in FIG. 5, after the hand gesture is determined to match with one preparation pattern in step S530, the command sensing method 500 further include steps S531, S532 and S533 before activating the tracking of the hand movement (i.e., step S540).

As shown in FIG. 1B, the displayer 128 is able to display an immersive environment to user's visions. In some embodiments, the displayer 128 is configured to display a virtual object in the immersive environment. The steps S531, S532 and S533 can be utilized to verify whether the hand gesture (matching the preparation pattern) is adjacent to the virtual object or not.

Figure 6A:
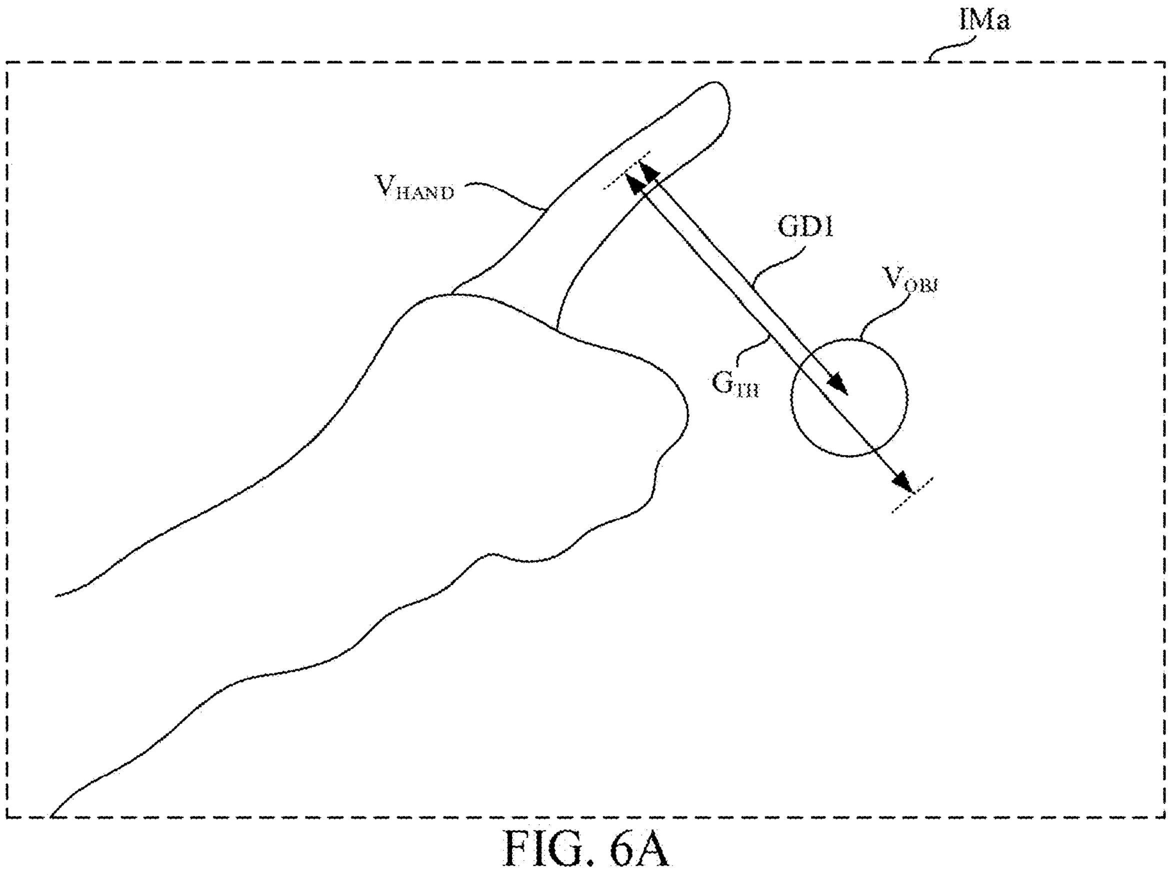
FIG. 6A is a schematic diagram illustrating an immersive environment displayed on the displayer according to some embodiments.
Figure 6B:
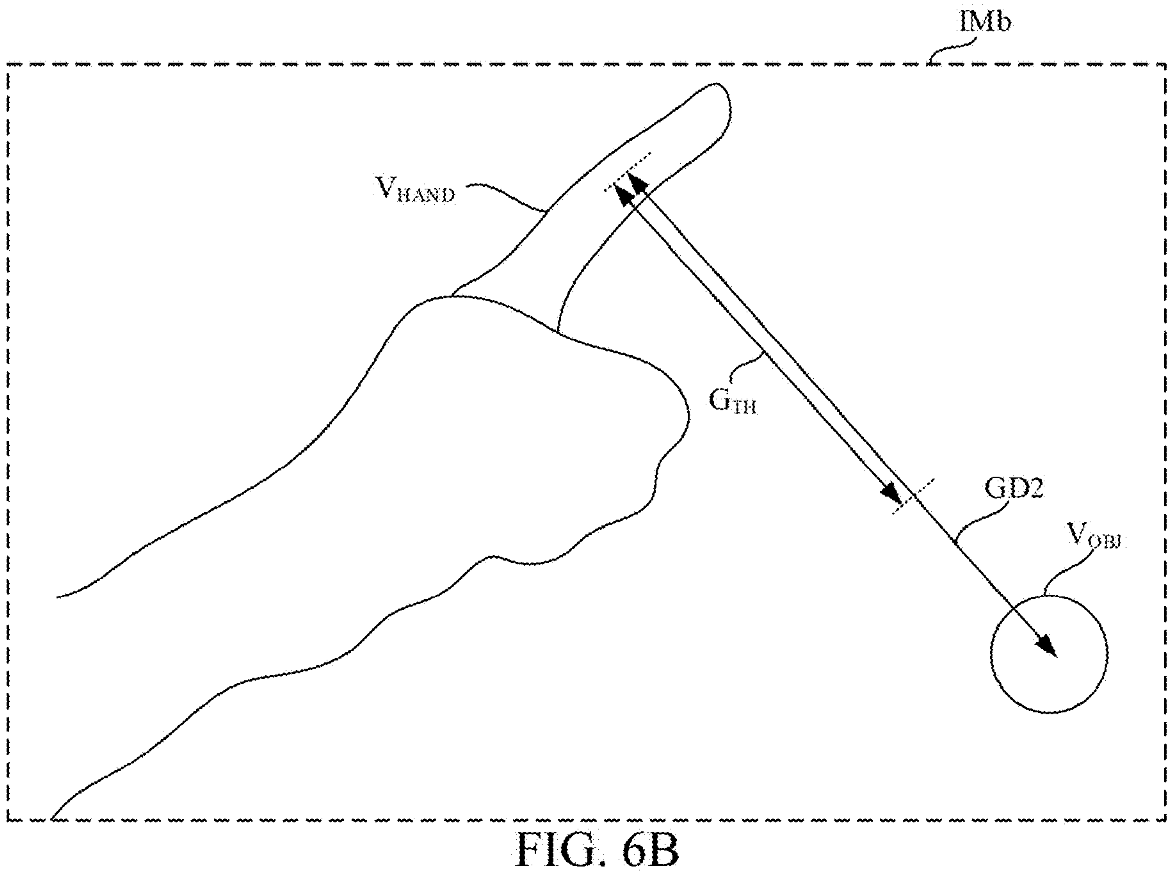
FIG. 6B is a schematic diagram illustrating another immersive environment displayed on the displayer according to some other embodiments.

Reference is further made to FIG. 6A and FIG. 6B. FIG. 6A is a schematic diagram illustrating an immersive environment IMa displayed on the displayer 128 according to some embodiments. FIG. 6B is a schematic diagram illustrating another immersive environment IMb displayed on the displayer 128 according to some other embodiments.

It is assumed that, in step S530, the processor 124 receives the streaming images IMGa (referring to FIG. 3A) from the camera 122, and the processor 124 determines that the hand gesture HGa in the streaming images IMGa matches with the clicking preparation pattern $P_{PRE1}$.

In this case, an avatar $V_{HAND}$ of the hand gesture can be displayed in the immersive environment IMa/IMb as shown in FIG. 6A or FIG. 6B. In step S531, the processor 124 is configured to locate a virtual position of the avatar $V_{HAND}$ of the hand gesture in the immersive environment IMa/IMb as shown in FIG. 6A or FIG. 6B. In step S532, the processor 124 is configured to detect a gap distance between the virtual position of the avatar $V_{HAND}$ of the hand gesture and the virtual object $V_{OBJ}$ in the immersive environment IMa/IMb as shown in FIG. 6A or FIG. 6B.

In embodiments shown in FIG. 5 and FIG. 6A, in step S532, the gap distance GD1 is detected between the virtual position of the avatar $V_{HAND}$ of the hand gesture and the virtual object $V_{OBJ}$ in the immersive environment IMa. In step S533, the gap distance GD1 is determined to be shorter than a threshold value $G_{TH}$, it means that the avatar $V_{HAND}$ of the hand gesture is relatively adjacent to the virtual object $V_{OBJ}$. The processor 124 can determine that that the user is about to (or highly possible to) interact with the virtual object $V_{OBJ}$. In this case, the command sensing method 500 goes to step S540 to activate the tracking of a hand movement.

On the other hand, in embodiments shown in FIG. 5 and FIG. 6B, in step S532, the gap distance GD2 is detected between the virtual position of the avatar $V_{HAND}$ of the hand gesture and the virtual object $V_{OBJ}$ in the immersive environment IMa. In step S533, the gap distance GD2 is determined to exceed the threshold value $G_{TH}$, it means that the avatar $V_{HAND}$ of the hand gesture is relatively far from the virtual object $V_{OBJ}$. The processor 124 can determine that that the user is not going to (or unlikely to) interact with the virtual object $V_{OBJ}$. In this case, the hand gesture (with the avatar $V_{HAND}$ located away from the virtual object $V_{OBJ}$) can be ignored, and in some embodiments the command sensing method 500 may return to step S520 for tracking and updating a location of the hand gesture.

In other words, the tracking of the hand movement (in step S540) is activated in response to the hand gesture matching with the preparation pattern and also the gap distance being shorter than the threshold value (e.g., the gap distance GD1 shown in FIG. 6A). In this case, when the user wave his/her hand around an empty area without any virtual object, the processor 124 can remain the tracking of the hand gesture (based on the camera 122) at a first stage and deactivate the tracking of the hand movement at a second stage, so as to reduce power consumption on the head-mounted display device 120 and/or the wearable device 140, and also to save computation resources on the head-mounted display device 120 and/or the wearable device 140.

Another embodiment of the disclosure includes a non-transitory computer-readable storage medium, which stores at least one instruction program executed by a processing unit (referring to the processor 124 shown in FIG. 1B discussed in aforesaid embodiments) to perform the command sensing method 200 as shown in FIG. 2 or the command sensing method 500 as shown in FIG. 5.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head-mounted display device, comprising:

a camera unit, configured to capture a plurality of streaming images;

a displayer, configured to display a virtual object in an immersive environment; and a processor, coupled to the camera unit, and the processor is configured to:

track a hand gesture according to the streaming images;

monitor whether the hand gesture matches with a preparation pattern;

locate a virtual position of the hand gesture in the immersive environment;

detect a gap distance between the virtual position of the hand gesture and the virtual object in the immersive environment;

in response to the hand gesture matching with the preparation pattern at a first time point and also the gap distance being shorter than a threshold value, activate a tracking of a hand movement during a sensing period started from the first time point until a second time point;

during the sensing period, monitor whether the hand movement matches with a command pattern corresponding to the preparation pattern; and in response to the hand movement matching with the command pattern, execute an operation corresponding to the command pattern.

2. The head-mounted display device of claim 1, wherein the processor is configured to track the hand gesture by:

performing a computer vision algorithm to locate knuckle positions of a hand in the streaming images; and tracking the hand gesture according to the knuckle positions.

3. The head-mounted display device of claim 1, further comprising:

a transceiver, configured to communicate with a wearable device, wherein the wearable device comprise an inertial measurement unit for generating inertial measurement data.

4. The head-mounted display device of claim 3, wherein in response to the hand gesture matching with the preparation pattern, the processor is configured to transmit a triggering signal to the wearable device for activating an inertial measurement unit of the wearable device.

5. The head-mounted display device of claim 3, wherein in response to the hand gesture matching with the preparation pattern, the processor is configured to track the hand movement according to inertial measurement data received from the wearable device.

6. The head-mounted display device of claim 3, wherein the wearable device comprises at least one smart ring wearable on at least one finger of a user.

7. The head-mounted display device of claim 1, wherein the processor is configured to track the hand movement by:

performing a computer vision algorithm to locate knuckle positions of a hand in the streaming images; and tracking the hand movement according to the knuckle positions.

8. The head-mounted display device of claim 1, wherein the processor deactivates the tracking of the hand movement in response to the hand gesture failing to match with the preparation pattern or in response to the sensing period being expired.

9. The head-mounted display device of claim 1, wherein the preparation pattern comprises a clicking preparation pattern with at least one finger hovering diagonally upward in front of the head-mounted display device, the command pattern comprises a clicking command pattern with the at least one finger pressing or moving downward.

10. The head-mounted display device of claim 1, wherein the preparation pattern comprises a pinching preparation pattern with two fingers hovering with a space between the two fingers, the command pattern comprises a pinching command pattern with the two fingers moving toward each other.

11. A command sensing method, comprising:

capturing a plurality of streaming images;

tracking a hand gesture according to the streaming images;

monitoring whether the hand gesture matches with a preparation pattern;

displaying a virtual object in an immersive environment;

locating a virtual position of the hand gesture in the immersive environment;

detecting a gap distance between the virtual position of the hand gesture and the virtual object in the immersive environment;

in response to the hand gesture matching with the preparation pattern at a first time point and also the gap distance being shorter than a threshold value, activating a tracking of a hand movement during a sensing period started from the first time point until a second time point;

during the sensing period, monitoring whether the hand movement matches with a command pattern corresponding to the preparation pattern; and in response to the hand movement matching with the command pattern, executing an operation corresponding to the command pattern.

12. The command sensing method of claim 11, wherein the step of tracking the hand gesture comprises:

performing a computer vision algorithm to locate knuckle positions of a hand in the streaming images; and tracking the hand gesture according to the knuckle positions.

13. The command sensing method of claim 11, wherein in response to that the hand gesture matches with the preparation pattern, the step of activating the tracking of the hand movement comprises:

transmitting a triggering signal to activate an inertial measurement unit of a wearable device.

14. The command sensing method of claim 13, wherein in response to that the hand gesture matches with the preparation pattern, the step of activating the tracking of the hand movement comprises:

tracking the hand movement according to inertial measurement data received from the wearable device.

15. The command sensing method of claim 11, further comprising:

deactivating the tracking of the hand movement in response to the hand gesture failing to match with the preparation pattern or in response to the sensing period being expired.

16. The command sensing method of claim 11, wherein the preparation pattern comprises a clicking preparation pattern with at least one finger hovering diagonally upward, the command pattern comprises a clicking command pattern with the at least one finger pressing or moving downward.

17. The command sensing method of claim 11, wherein the preparation pattern comprises a pinching preparation pattern with two fingers hovering with a space between the two fingers, the command pattern comprises a pinching command pattern with the two fingers moving toward each other.

18. A non-transitory computer readable storage medium with a computer program to execute a command sensing method, wherein the command sensing method comprises:

capturing a plurality of streaming images; and tracking a hand gesture according to the streaming images;

monitoring whether the hand gesture matches with a preparation pattern;

displaying a virtual object in an immersive environment;

locating a virtual position of the hand gesture in the immersive environment;

detecting a gap distance between the virtual position of the hand gesture and the virtual object in the immersive environment; and in response to the hand gesture matching with the preparation pattern at a first time point and also the gap distance being shorter than a threshold value, activating a tracking of a hand movement during a sensing period started from the first time point until a second time point;

during the sensing period, monitoring whether the hand movement matches with a command pattern corresponding to the preparation pattern; and in response to the hand movement matching with the command pattern, executing an operation corresponding to the command pattern.

* * * * *